Jan. 9, 1951 W. B. MASSEY 2,537,361
DEVICE FOR FILLING CARTONS
Filed July 5, 1947
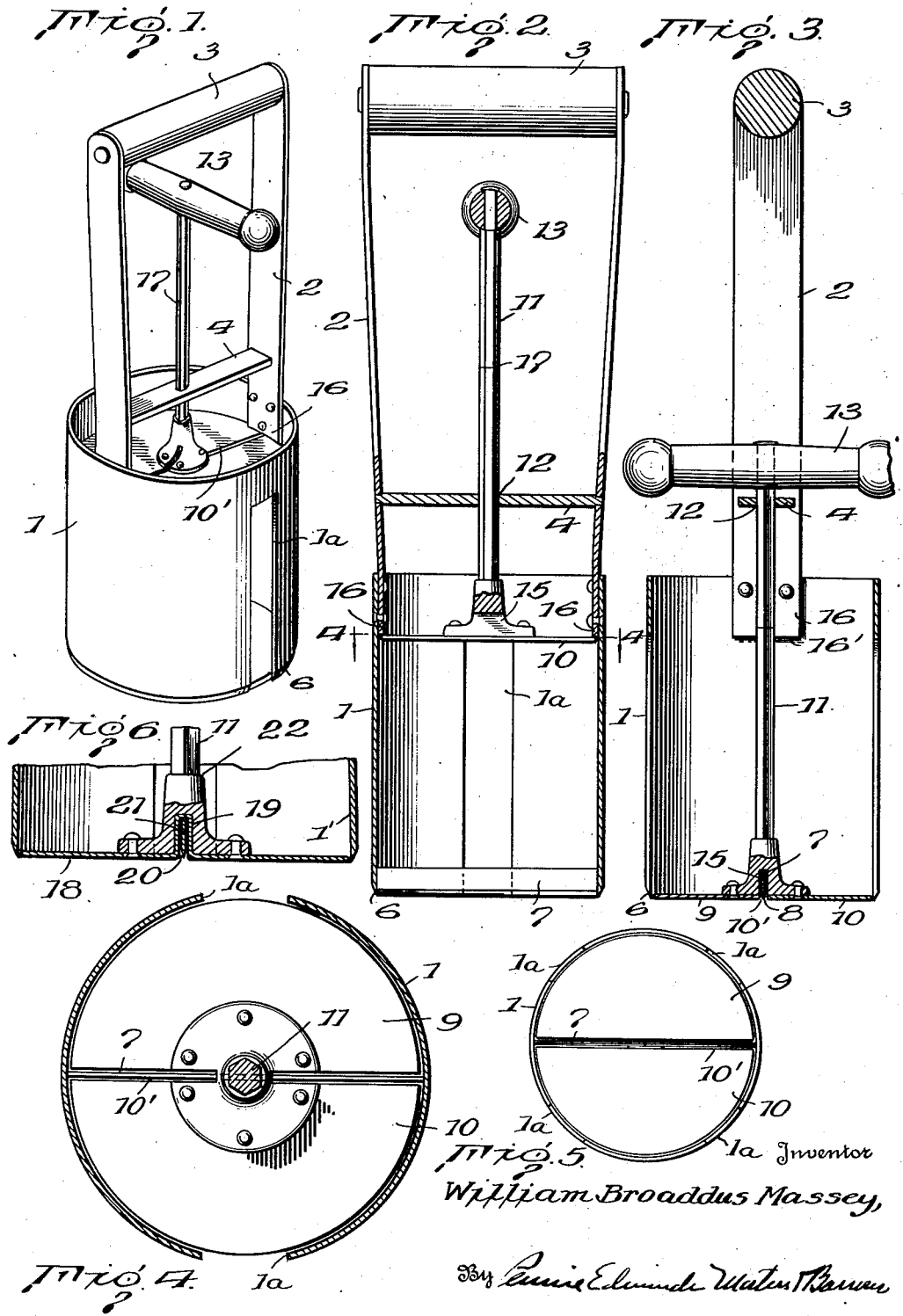
Inventor
William Broaddus Massey,

UNITED STATES PATENT OFFICE 2,537,361

DEVICE FOR FILLING CARTONS

William Broaddus Massey, Richmond, Va.

Application July 5, 1947, Serial No. 759,032

6 Claims. (Cl. 107—48)

This invention relates to an improved form of device for filling cartons or containers with a plastic or semi-solid substance such as ice cream, butter, lard or the like.

It heretofore has been proposed to provide measuring devices for ice cream and other substances of like consistency which are filled by forcing them into a body of the substance one or more times until they are filled, after which the measured quantity of the substance is forced out by a suitable plunger or the like into an appropriate container. Such devices heretofore proposed have not been completely satisfactory for one or more reasons and have been used only to a very limited extent. Among the main objections to such devices is the difficulty of forcing them into a body such as ice cream, particularly when the ice cream is relatively hard, and ejecting the ice cream from the measuring device into a carton after the device has been filled.

Ice cream, in addition to having a certain amount of plasticity which enables it readily to be compacted or compressed, also possesses considerable adhesiveness and, consequently, has a considerable tendency to adhere to a surface with which it comes into contact even though the surface may be a polished metal one. Consequently, when ice cream is being forced into a measuring or filling device it exerts a pressure on the ice cream already in the device which causes the ice cream in the device to exert a considerable lateral pressure against the side walls of the device, which, together with the tendency of the ice cream to adhere to the inner wall of the device, makes it necessary to exert a considerable force on the device in order to shove it into a body of ice cream. Likewise, the force exerted on the ice cream in ejecting it into a carton causes the ice cream to exert a lateral force against the inside walls of the measuring or filling device which makes it more difficult to eject the ice cream.

A further objection to such devices as heretofore have been proposed, at least insofar as they are used in connection with ice cream, is that they have not consistently delivered the desired amount. The adhesive properties of ice cream and its tendency to stick together is so great that if one tries to remove a measured core by forcing a measuring device into a mass of it, and then pulling the device out, a portion of the ice cream within the measuring device frequently will be pulled out and remain with the larger mass of the ice cream.

In accordance with the present invention there is provided a measuring or filling device for ice cream or the like in which the force necessary to push it into a mass of ice cream is considerably less than is necessary with devices of the types heretofore proposed; and such a device which will consistently remove an accurately measured quantity of the ice cream.

More specifically, the measuring or filling device of the present invention comprises a generally cylindrical can-like measuring receptacle having one or more openings or slots of appreciable width extending longitudinally thereof from the lower end, with a thin vertically-positioned cut-off bar or knife extending diametrically across the body of the cylinder and having its cut-off edge lying in the plane of the bottom of the cylinder. When such a device is forced into a mass of ice cream the longitudinally-extending openings or slots enable the lateral pressure exerted by the ice cream within the cylinder to be relieved to an appreciable extent without interfering with the measured amount of ice cream being removed from the mass thereof. Furthermore, as such openings or slots are of appreciable width they appreciably and proportionately reduce the force necessary to force the cylinder into the mass of ice cream, in the same manner in which it is easier to force a fork into a body than it is to force a flat blade into it. When such a device is forced into a mass of ice cream far enough to cause a desired amount of ice cream to be forced up into it and then rotated at an angle of 45°, or even less, the edges defining the longitudinally-extending openings or slots will act to sever the web of ice cream connecting the ice cream within the cylinder with the main body of ice cream. Simultaneously, the cut-off bar will hold the ice cream in the cylinder so that it will turn with the cylinder, while the bulk of the ice cream will remain stationary. Thus, the ice cream in the cylinder is separated from the bulk of the ice cream in the plane of the lower edge of the cutter bar. The core of ice cream then readily may be removed merely by withdrawing the device, the adherence of the core to the internal wall of the cylinder of the device being sufficient to cause it to remain in the cylinder while the cylinder is being withdrawn.

After a measured core of the ice cream has been removed from a mass thereof it may be ejected from the measuring or filling device by a plunger or in any other desired manner.

The invention will be further illustrated in connection with the accompanying drawings but it is to be understood that such further disclosure is by way of exemplification and the invention is not limited thereto except as may be defined in the appended claims.

In the drawings:

Fig. 1 is a perspective view of one embodiment of my invention;

Fig. 2 is a vertical sectional view with the ejector disc in its uppermost position;

Fig. 3 is a vertical sectional view taken at right angles to Fig. 2 and with the ejector disc in its lowermost position;

Fig. 4 is a horizontal sectional view on line 4—4 of Fig. 2;

Fig. 5 is a bottom view of a similar form of the invention but showing the receptacle wall of the device provided with four longitudinally-extending slots; and Fig. 6 is a vertical sectional view showing a modified form of the invention.

The form of the measuring or filling device shown in Figs. 1 to 4 of the drawings comprises a measuring can or receptacle 1 which generally is of cylindrical form. The receptacle 1 is open at both ends and has a pair of handle-supporting members secured to the inside of its upper end by rivets or the like. The handle-supporting members extend a substantial distance above the upper edge of the receptacle. A handle 3 is secured between the upper ends of the members 2 and a reinforcing and guiding bar 4 extends between said members at a position somewhat above the upper edge of the measuring receptacle.

The lower edge of the receptacle 1 is beveled inwardly at 6 to provide a knife edge in alignment with the inner wall of the receptacle. A narrow, vertically-extending cut-off bar 7 having a knife edge 8 lying in the plane of the lower edge of the receptacle 1 extends diametrically across the lower edge of the receptacle and is welded or otherwise secured to the internal wall thereof.

Closely fitting and reciprocably mounted within the receptacle 1 is an ejector disc comprising a pair of semi-circular plates 9 and 10 secured to the lower end of a plunger rod 11 and spaced apart to form a slit or recess 10' just sufficiently wide to freely receive the cut-off bar 7. The plunger rod 11 extends through an opening 12 in the guiding bar 4 and has an actuating handle 13 on its upper end which extends substantially at right angles to the bar 4. The plunger rod 11 and the opening 12 in the bar 4 through which it extends are both of angular formation so that while the ejector disc is free to reciprocate within the receptacle 1 rotation is prevented and the cut-off bar 7 always will be received within the slit or recess 10' in the ejector disc and a recess 15 in the lower end of the plunger rod 11. The inner end of the recess 15 forms an abutment for the upper edge of the cut-off bar 7 when the ejector disc is in its lowermost position and causes the downward movement of the ejector disc to be stopped when its lower face is flush with the lower edge of the receptacle 1. The lower ends 16 of the handle-supporting bars form abutments 16' to limit the upward movement of the ejector disc, and to that end are positioned so that when the ejector disc is in its uppermost position, as shown in Fig. 2, just the desired amount, for example a pint, of ice cream, may be received within the measuring receptacle.

The plunger rod 11 is provided with a suitable mark 17 so that if it is desired to measure and extract only one-half the amount of ice cream which the receptacle normally is intended to receive, upward movement of the ejector disc and the plunger rod may be stopped when the mark 17 is opposite the upper edge of the bar 4.

The device as described above will usually be formed to receive one pint of ice cream, although it may be used to measure and extract one-half pint by limiting the upward movement of the ejector disc and plunger rod 11, as indicated above. Likewise, it may be used for measuring larger quantities by filling and discharging the receptacle 1 a plurality of times.

To render it easier to force the receptacle 1 into a mass of ice cream, and to eject ice cream from it, the wall of the receptacle is provided with one or more openings or slots 1ᵃ of appreciable width. The slots 1ᵃ extend longitudinally from the open lower edge of the receptacle upwardly as far as the receptacle will be filled with ice cream. In the form of the invention shown in Figs. 1 to 4 two such slots are shown and are spaced diametrically opposite one another in a plane normal to the direction of the cut-off bar 7. The slots may be as wide as is consistent with the strength of the material from which the receptacle is formed. When only two such slots are provided they preferably will be from one-fourth to one and one-half inches wide. If more than two slots are provided, for example, four, as shown in Fig. 5, the slots preferably are of slightly less width, for example, from one-fourth to three-fourths of an inch.

The slots 1ᵃ terminate at a level opposite the upper position of the semicircular plunger plates or discs 9 and 10, so that the receptacle wall portions between them are connected at their upper ends by a continuous band of sufficient width to hold the spaced lower portions between the slots 1ᵃ against displacement. When the receptacle is formed with only two slots, and the slots are positioned diametrically opposite one another and normal to the cut-off bar, the cut-off bar ties the two sections together and acts as a reinforcing member to further prevent any spreading of their lower ends. When the receptacle is formed with more than two of the longitudinally-extending slots, as in Fig. 5, the cut-off bar will tie the lower ends of two of the spaced sections together while the other two sections depend upon the continuous band at the top of the receptacle to hold them against spreading. However, if the receptacle 1 is made of sheet metal of sufficient gauge the continuous band at the top will be sufficient to maintain the sections between the longitudinally-extending slots against spreading or displacement, even when the cut-off bar is not utilized.

Assuming that it is desired to measure a pint of ice cream with the present device and to place it in the usual ice cream carton, the device is gripped by the handle 3 and forced into the mass of ice cream in the can or other receptacle, preferably while the handle is being moved back and forth slightly in the direction of its length to facilitate entry of the measuring receptacle into the mass of ice cream, until the core of ice cream within the receptacle 1 has forced the ejector disc to its uppermost position, as shown in Fig. 2. The handle 3 then is turned, in a horizontal plane, through an arc of about 45° to cause the lower edge of the cut-off bar to sever the lower end of the core within the receptacle 1 from the larger mass of ice cream, and to sever the webs of ice cream in the slots 1ᵃ which connect the sides of the core within the receptacle with the mass of ice cream from which the core is being cut. The device containing the measured core of ice cream then is removed and the lower end of the receptacle placed in a pint ice cream carton and the core, an exact pint of ice cream, forced into the carton by means of the ejector disc.

The ejection of the core from the receptacle 1 can best be accomplished by placing the thumbs of each hand over the handles 13 and the fingers of the hands beneath the bar 4 and forcing them together. Having the handle 13 extend at right angles to the bar 4 puts it in proper position for it and the bar 4 to be so grasped with one hand at each side of the bar 4. By gripping the handle 13 and bar 4, the downward force applied to the handle is substantially equally distributed on opposite sides of the plunger rod 11 so that it and the ejector disc are forced downwardly without any binding action of the plunger rod on the bar 4 or ejector disc against the inside wall of the receptacle 1.

If the amount of ice cream received in the receptacle is, say a pint, and it is desired to dish out a quart of ice cream, after the first core of ice cream has been forced into the carton, the ejector disc may be held in its lowermost position, as shown in Fig. 2, and the device used to pack the ice cream into the bottom of the carton so that the second pint core may be received. The operation is then repeated and the second core extracted from the mass of ice cream and ejected into the carton. The ejector disc may then be used to smooth off the top of the ice cream in the carton before the top is placed on the carton.

The cut-off bar 7 is made sufficiently wide to effectively reinforce the bottom of the receptacle 1 and hold it in true circular shape, as set forth above. However, due to its thinness, it will offer no appreciable resistance to ice cream being forced into or ejected from the receptacle; neither is it of sufficient width to cause a void to be formed in the middle of the core while the latter is within the receptacle, as the lateral pressure upon the ice cream above the cut-off bar, due to its being forced into the receptacle, will cause the narrow space formed by the cut-off bar to be completely filled.

The slots 1a render it easier both to force the receptacle into a mass of ice cream and to eject the ice cream into a carton or other receptacle after it has been filled. When a measuring receptacles having a continuous periphery is forced into a body of ice cream, the ice cream being forced into a lower end of the receptacle causes a pressure to be exerted on the ice cream already in the receptacle, which, due to the semi-solid nature of the ice cream, is effective in all directions. That results in the ice cream in the receptacle exerting an appreciable lateral force against the inside of the receptacle, which, in turn, increases the frictional resistance between the ice cream and the inside wall of the receptacle, making it more difficult to force the receptacle into the body of ice cream. When the receptacle is formed with longitudinally-extending slots of substantial width, such as the slots 1a, such slots provide means for relieving the lateral pressure exerted by the ice cream against the inside walls of the receptacle and consequently reduces th frictional rsistance to forcing the receptacle into a body of ice cream. Also, as providing the receptacle with the slots results in the area of the receptacle wall which is forced into the body of ice cream being reduced, the frictional resistance between the ice cream and the walls of the receptacle is further reduced by an amount equal to that proportion which the total of the width of the several slots bears to the periphery of the receptacle.

In like manner, when the core for a measured quantity of ice cream is being ejected from the receptacle the slots 1a prevent the lateral pressure caused by the action of the plunger discs 9 and 10 on the ice cream to be relieved, so that it is easier to eject or discharge the ice cream from the receptacle.

In Fig. 6 is shown an alternative way of forming the slit or recess in the ejector disc which receives the cut-off bar when the disc is in its lowermost position. According to that form of the invention, the ejector disc 18 is continuous and is bent upon itself at its center to form a saddle 19 having a recess 20 to receive the cut-off bar 21. The lower end of the plunger rod 22 which is secured to the ejector disc is likewise provided with a recess to receive the saddle 19. In this form of the device the wall of the receptacle 1' instead of being truly cylindrical diverges slightly towards its lower end and the ejector disc is of a diameter slightly less than the diameter of the upper end of the receptacle 1'. Having the receptacle wall diverge slightly towards its lower open end further causes the amount of pressure necessary to be exerted on the ice cream in the receptacle to eject or discharge it to be reduced. In all other respects the device of Fig. 6 is identical with the device shown in Figs. 1 to 5.

In either form of the invention, the recess in the ejector disc is of a width just sufficient to freely receive the cut-off bar, so that when the ejector disc is depressed to eject the cone of ice cream, any ice cream which otherwise would adhere to the cut-off bar will be scraped off.

From the aforegoing description, it will be apparent that the present invention provides a measuring device for ice cream or the like which requires relatively little effort to fill and discharge, and which will consistently extract and eject an accurately measured quantity of ice cream or other plastic. Furthermore, as the core of the material is completely cut off from the mass of the material before the device is withdrawn, the formation of voids within the core, due to a portion of the plastic forming the core adhering to the mass of material, is avoided, and an accurately measured quantity of the material is extracted and ejected on each operation.

I claim:

1. A device of the class described comprising a generally cylindrical measuring receptacle having an open end, said receptacle also having a plurality of slots extending generally longitudinally thereof from its open end and terminating a distance from its other end to leave a continuous band of substantial width at said other end to which the receptacle sections separated by said slots are attached, a cut-off member extending across said open end of the receptacle, said cut-off member being secured at each end to the inside of diametrically opposite sections of the receptacle which are separated by said slots, an ejector reciprocably mounted in said receptacle and an actuating member attached to said ejector.

2. A device of the class described comprising a generally cylindrical measuring receptacle having an open end, said receptacle also having a plurality of slots extending generally longitudinally thereof from its open end and terminating a distance from its other end to leave a continuous band of substantial width at said other end to which the receptacle sections separated by said slots are attached, a cut-off member extending across said open end of the receptacle, said cut-off member being secured at each end to the inside of diametrically opposite sections of the receptacle which are separated by said slots, an ejector reciprocably mounted in said receptacle and having a recess for receiving said cut-off member when said ejector is in its most advanced position in the direction of the open end of the receptacle, and an actuating member attached to said ejector.

3. A device of the class described comprising a generally cylindrical measuring receptacle having an open end, a thin cut-off bar extending across said open end of the receptacle and having its narrow dimension normal to the longitudinal axis of the receptacle, said cut-off bar being secured at each end to the inside of the receptacle and having one edge thereof lying in the plane of the open end of said receptacle, an ejector disc reciprocably mounted in said receptacle and having a recess for receiving said cut-off bar when said ejector disc is in its most advanced position in the direction of the open end of the receptacle, and an actuating member attached to said ejector disc.

4. A device of the class described comprising a generally cylindrical measuring receptacle having an open end, a thin cut-off bar extending across said open end of the receptacle and having its narrow dimension normal to the longitudinal axis of the receptacle, said cut-off bar being secured at each end to the inside of the receptacle and having one edge thereof lying in the plane of the open end of said receptacle, an ejector disc reciprocably mounted in said receptacle, said ejector disc being folded upon itself to form a saddle defining a recess for receiving said cut-off bar when said ejector disc is in its most advanced position in the direction of the open end of the receptacle, and an actuating member attached to said ejector disc.

5. A device of the class described comprising a generally cylindrical measuring receptacle having an open end, a thin cut-off bar extending across said open end of the receptacle and having its narrow dimension normal to the longitudinal axis of the receptacle, said cut-off bar being secured at each end to the inside of the receptacle and having one edge thereof lying in the plane of the open end of said receptacle, an ejector disc reciprocably mounted in said receptacle and having a recess for receiving said cut-off bar when said ejector disc is in its most advanced position in the direction of the open end of the receptacle, an actuating member rigidly attached to said ejector disc, a pair of handle-supporting members extending from opposite sides of said measuring receptacle at the end thereof remote from said open end, and a guiding bar extending between said handle-supporting members between said handle and the adjacent end of said receptacle, said guiding bar having an opening in which said actuating member is reciprocably but non-rotatably mounted.

6. A device of the class described comprising a generally cylindrical measuring receptacle having an open end, a thin cut-off bar extending across said open end of the receptacle and having its narrow dimension normal to the longitudinal axis of the receptacle, said cut-off bar being secured at each end to the inside of the receptacle and having one edge thereof lying in the plane of the open end of said receptacle, an ejector disc reciprocably mounted in said receptacle and having a recess for receiving said cut-off bar when said ejector disc is in its most advanced position in the direction of the open end of the receptacle, an actuating member rigidly attached to said ejector disc, a pair of handle-supporting members extending from opposite sides of said measuring receptacle at the end thereof remote from said open end, and a guiding bar extending between said handle-supporting members between said handle and the adjacent end of said receptacle, said guiding bar having an opening in which said actuating member is reciprocably but non-rotatably mounted, said actuating member having a handle on its upper end extending substantially at right angles to said guiding bar.

WILLIAM BROADDUS MASSEY.

REFERENCES CITED

The following references are of record in the file of this patent:

UNITED STATES PATENTS

| Number | Name | Date |
|---|---|---|
| 241,864 | Huner | May 24, 1881 |
| 493,536 | Tipton | Mar. 14, 1893 |
| 520,917 | Eggeling | June 5, 1894 |
| 866,079 | Smith | Sept. 17, 1907 |
| 1,776,258 | Hood | Sept. 23, 1930 |
| 1,978,942 | Harris | Oct. 30, 1934 |